United States Patent [19]
Neff

[11] Patent Number: 5,348,604
[45] Date of Patent: Sep. 20, 1994

[54] METHOD AND APPARATUS FOR APPLYING A HEATED COMPOSITION TO A SUBSTRATE

[76] Inventor: Craig A. Neff, 13950 W. 20th Ave., Suite 109, Golden, Colo. 80401

[21] Appl. No.: 10,859

[22] Filed: Jan. 29, 1993

[51] Int. Cl.⁵ .............................................. B32B 31/00
[52] U.S. Cl. ............................... 156/272.8; 156/272.2; 156/275.7; 156/379.6; 118/620; 427/487; 427/508; 427/516; 427/561
[58] Field of Search ............... 156/272.8, 272.2, 379.6, 156/275.7; 118/620, 641; 427/487, 516, 521, 561, 596

[56] References Cited
U.S. PATENT DOCUMENTS

| | | | |
|---|---|---|---|
| 4,029,535 | 6/1977 | Cannon et al. | 156/272.8 |
| 4,069,080 | 1/1978 | Osborne | 156/272.8 |
| 4,109,431 | 8/1978 | Mazzoni et al. | 52/400 X |
| 4,636,609 | 1/1987 | Nakamata | 219/121 LD |
| 4,644,127 | 2/1987 | La Rocca | 219/121 FS |
| 4,861,404 | 8/1989 | Neff | 156/204 |
| 4,931,125 | 6/1990 | Volkmann et al. | 156/272.8 |
| 5,043,548 | 8/1991 | Whitney et al. | 427/596 X |

Primary Examiner—David A. Simmons
Assistant Examiner—M. Curtis Mayes
Attorney, Agent, or Firm—Dickinson, Wright, Moon, Van Dusen & Freeman

[57] ABSTRACT

An extrudable material, such as a hot melt adhesive, is applied to a substrate with simultaneous irradiation by a laser beam. The energy of the laser is absorbed by the adhesive and the substrate to cause the adhesive to spread into the fabric. When applied to a gap between two substrate sheets, the extrudable material creates a very strong bond. When one of the substrate materials is porous, the extrudable material will penetrate the thickness of the material and contact a lower layer to form a bond. The extrudable material is applied through a nozzle, and the laser beam is directed through the nozzle to be coaxial with the flow path of the extrudable material. The coaxial arrangement facilitates movement of the nozzle and beam in complicated patterns and ensures simultaneous application of the extrudable material and the laser beam.

21 Claims, 3 Drawing Sheets

METHOD AND APPARATUS FOR APPLYING A HEATED COMPOSITION TO A SUBSTRATE

TECHNICAL FIELD

This invention relates to the art of applying a heated composition to a substrate. In the preferred embodiment, the invention relates to the art of bonding together sheets of material with an extrudable medium, such as a hot melt adhesive.

BACKGROUND

Compositions that are activated by heat are known. For example, a common composition is a hot melt adhesive, which is heated to a liquid, or other flowable state, and applied to two articles to be secured together. Upon cooling, the composition becomes firm and provides adhesive properties that hold the articles together. The use of hot melt adhesives to secure two sheets of synthetic materials together is described in my earlier U.S. Pat. No. 4,861,404.

According to that earlier patent, the adhesive composition is also irradiated by a laser beam, which impinges on a line of the adhesive after it has been deposited onto the sheets of material to be secured together. The irradiation assists in obtaining a good bond between the adhesive and the material.

Irradiation of a surface hardening material before its application to a metal substrate is shown in U.S. Pat. No. 4,644,127 (LaRocca).

It is also known to pretreat a surface to be bonded (see U.S. Pat. No. 4,931,125 to Volkmann et al.) and to use a laser to heat and bond thermoplastic sheets (see U.S. Pat. Nos. 4,069,080 to Osborne, 4,636,609 to Nakamata, and 4,029,535 to Cannon).

The prior techniques suffer from several disadvantages. For example, the technique taught by 4,861,404 does not allow the energy of the laser to assist in melting the adhesive prior to its deposition, does not accommodate adhesive patterns other than straight lines, and permits cooling of the adhesive between application and subsequent heating by the laser. While the LaRocca patent shows laser melting of a metallic composition to be applied to a surface, it permits only minimal contact between the composition and the laser beam and does not facilitate following complicated patterns.

SUMMARY OF THE INVENTION

In accordance with the invention, a composition is heated before its application to a substrate by passing it through a nozzle that combines the flow path of the composition with the optical path of a beam of electromagnetic energy. In the preferred embodiment, the composition is a hot melt adhesive, and the beam of energy is obtained from a YAG laser.

The flow path of the nozzle is supplied with liquid adhesive through a channel that extends transverse to the flow path. The flow path may be cylindrical but is preferably conical to provide a narrow discharge orifice for the adhesive. The end of the flow path opposite the discharge orifice is formed by an optical window that permits the laser beam to enter the flow path. The optical window and the flow path are oriented such that the laser beam and the flow path are coaxial. The optical window may be planar, but preferably has curved surfaces to provide optical power to cause the laser beam to converge at an angle similar to the conical angle of the nozzle. This arrangement allows a maximum transfer of energy to the adhesive, prevents interaction between the sides of the nozzle and the laser beam, and simultaneously heats the substrate and the adhesive.

The orifice of the nozzle may be circular or elongated. If an elongated orifice is used, the window will be cylindrical to match the shape of the laser beam to that of the orifice. An elongate orifice would be used, for example, for depositing the extrudable material over a wider surface area, the nozzle being moved over the surface in a direction transverse to the direction of the elongate opening.

Because the energy beam and the adhesive are coincident, they are moved with respect to the substrate easily. In the preferred embodiment, the substrate is attached to an X-Y table that is driven by digital linear motors and controlled by a computer.

The physical dimensions of the flow path (e.g., its length and cross section) are selected to provide the desired interaction between the laser and the adhesive and the desired size of the bead of adhesive on the substrate. The interaction between the adhesive and the laser is also determined by the absorption characteristics of the adhesive and the spectrum of the laser, and this is taken into consideration when designing the nozzle. Applicant has found that a nozzle providing a flow path having a length of 0.5 in., and a diameter of 0.090 in. provides good results when the adhesive is nylon and the energy beam is produced by a 150 W YAG laser.

The nozzle may be mounted in a bracket that allows it to be removed and replaced with another nozzle of different size to permit adjustment of the nozzle to various thicknesses and types of materials.

The adhesive is preferably heated to place it in a flowable state just prior to its being supplied to a pump for entry into the nozzle. This eliminates the need for addition of chemicals to the adhesive, which are normally required to prevent degradation due to interaction between the heated adhesive and air, thus providing a more pure adhesive.

The sheets of material to be secured together may be adjacent each other, in which case the adhesive is placed at the line of contact. If one (or more) of the sheets is porous, however, it may be placed on top of the other sheet so that the adhesive passes through it to the lower sheet.

DETAILED DESCRIPTION OF THE INVENTION

Figure 1:
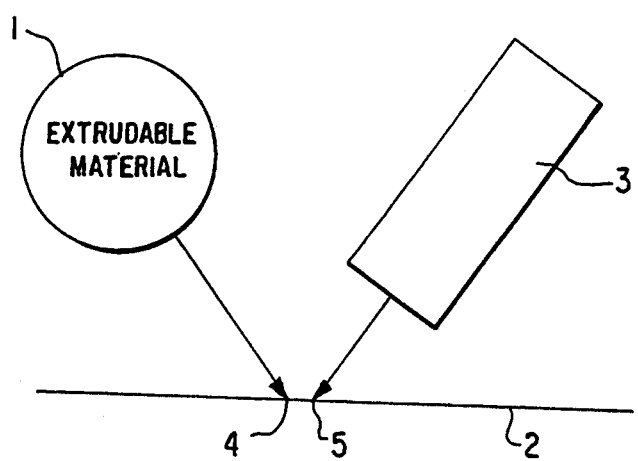
FIG. 1 is a schematic diagram of the invention, showing simultaneous application of a beam of electromagnetic energy and an extrudable material on a target substrate.

FIG. 1 is a schematic view illustrating the principles of the invention. An extrudable material 1 is applied to the surface of a target substrate 2 at a contact location, and an electromagnetic energy beam 3 is incident on the substrate at an irradiation location. The irradiation point 5 is sufficiently close to the contact point 4 that the extrudable material is heated by the energy of the beam and retains a liquid or semi-liquid state. Loss of this liquid or semi-liquid state would generally accompany a loss of solvent or cooling that would occur if the extrudable material were exposed to ambient conditions for a period of time. If the irradiation point and material contact point are separated to the extent that the extrudable material looses its liquid or semi-liquid state too soon, maximum penetration of the extrudable material into the target material is prevented. Preferably the material contact point and the irradiation point coincide.

Figure 2:
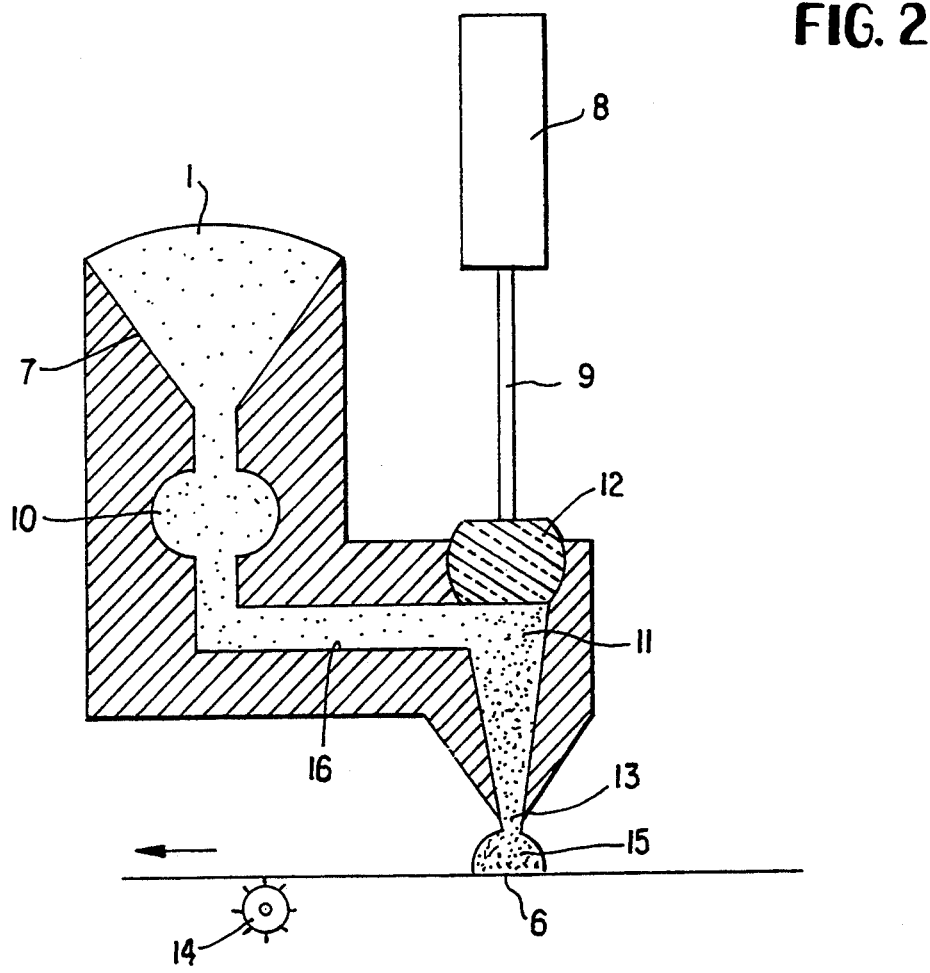
FIG. 2 is a transverse cross section of a preferred embodiment of the invention.

FIG. 2 is a vertical cross section of a preferred embodiment of the invention. As shown in this figure, the material contact point coincides with the irradiation point at the point of application 6. Thus, the opportunity for the extrudable material to cool and change its state too soon are minimized. Reservoir 7 contains extrudable material 1, for example, a hot melt adhesive. The size and properties of the reservoir are a function of the nature of the extrudable material. If the extrudable material is a thermoplastic, the reservoir will be provided with a heater to melt the material. If the extrudable material is a solvent-based chemical system or a chemical with a substantial vapor pressure, the reservoir will be enclosed to prevent the release of the extrudable material from the reservoir. If the extrudable material is a water or air-cured glue, the reservoir will be enclosed to prevent the entry of oxygen, water and other compounds which could adversely affect the properties of the extrudable material. If the extrudable material is a light-cured glue, the reservoir must be opaque to those frequencies of light that promote the curing of the glue.

A source of electromagnetic energy radiation, preferably a high-power laser 8, provides a beam 9 of electromagnetic energy.

The extrudable material is conveyed from the reservoir by pump 10, which is preferably driven by a digital motor that can be precisely controlled to regulate the amount of extrudable material delivered by the system. The extrudable material is forced through channel 16 into a flow path 11 of a nozzle. An optical window 12 is attached to one end of the nozzle to close one end of the flow path. The window is transparent to the frequencies of the beam 9, however, to allow the beam 9 to be directed into the flow path and to contact the extrudable material. Optical window 12 may be configured to have optical power to shape the energy beam. The flow path is preferably conical, and the beam is shaped to converge at the same angle as the conical flow path. Directing the energy beam and the extrudable material into a common pathway ensures that the point of application and the material contact point coincide and that the interaction between the energy beam and the extrudable material is of sufficient duration.

The nozzle includes an orifice 13 through which the extrudable material and the laser beam exit. The configuration of the orifice 13 determines the size and shape of bead 15 of extrudable material. It will be appreciated that the energy of the laser beam is dispersed at the point of application by absorption by the extrudable material and by the substrate.

If the extrudable material is a light-cured glue, the volume of material in the flow path must be carefully controlled to prevent the curing of the glue within the nozzle.

In accordance with this embodiment of the invention, extrudable material 1 and laser beam 9 pass through orifice 13 and are incident on the target material 2 simultaneously. To facilitate this simultaneous application, the flow path of the extrudable material and the path of the laser beam are coaxial. This arrangement obviates the need to change the path of the laser within the mixing chamber, as by use of a reflective mirror.

In the preferred embodiment, the substrate is moved beneath orifice 13 by a digital linear motor 14. This provides easy joint control of linear motor 14 and pump 10, preferably with the aid of a micro-processor, so that the extrudable material can be applied along the substrate as continuous lines, which may be straight or curved, as well as interrupted lines, such as dots and dashes. The use of a digital motor is highly advantageous, because its precise control allows the extrudable material to be applied in controlled portions. Furthermore, a computer or other micro-processor based system can be used to coordinate the movement of the target material with operation of pump 10 to ensure that the extrudable material is applied in the desired amount with respect to the target material.

In the preferred embodiment, the extrudable material is somewhat transparent to the electromagnetic energy of the laser beam whereby the energy of the laser beam is not completely absorbed in the nozzle flow path. The properties of the laser and the extrudable material are selected such that the extrudable material absorbs enough of the laser energy to heat the extrudable material to a desired temperature and yet to provide energy to continue to heat the extrudable material and the substrate after deposition of the extrudable material. For example, the extrudable material can be superheated (super-irradiated) to increase its penetration into the target material 2.

Figure 3:
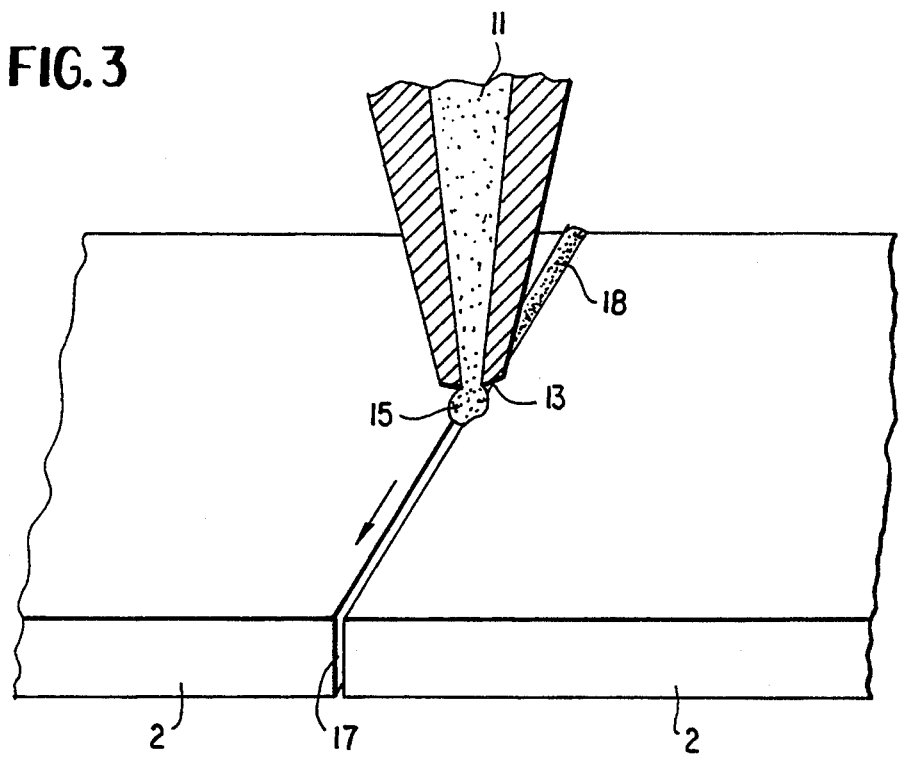
FIG. 3 illustrates bonding two sheets of material with an extrudable material in accordance with the invention.

FIG. 3 illustrates an embodiment of the invention wherein surface application of extrudable material is used for bonding. Two pieces of target material 2 are aligned with a gap 17, which is preferably small compared to the width of a bead 15 of extrudable material. Orifice 13 is moved along gap 17 to direct the laser beam and the extrudable material onto the two pieces of material to create continuous seam 18. The simultaneous application of laser beam energy and the extrudable material causes the extrudable material to penetrate into the internal structure of both pieces of target material. Thus, the extrudable material spreads beyond the gap into the target material 2, resulting in a smooth and strong butt bond. This provides a seam that has the appearance and properties of a single sheet of target material.

Figure 4:
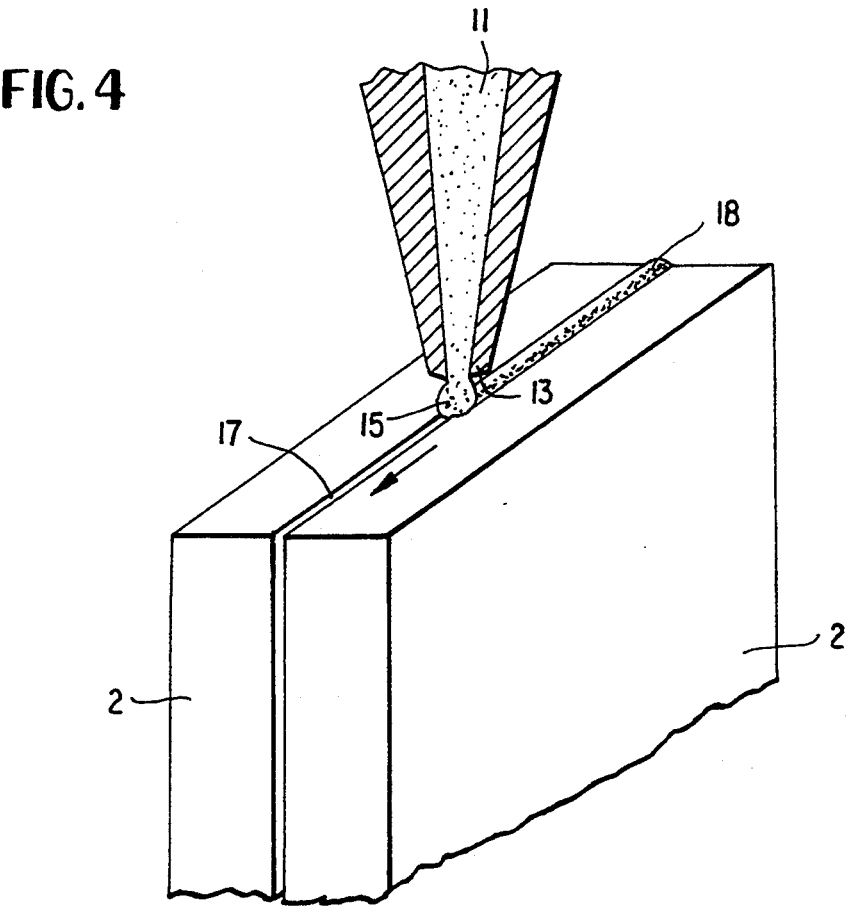
FIG. 4 illustrates another embodiment for bonding with extrudable material in accordance with the invention.

FIG. 4 illustrates butt welding of two sheets of target material 2 aligned edge-to-edge with total overlap, the butt bond being formed on the edge surfaces of the sheets. Seam 18 is created along gap 17 to hold the two sheets together. Application of a small amount of flexible extrudable material along the gap will allow independent movement of the target material sheets about the seam after the bond has been formed.

Figure 5:
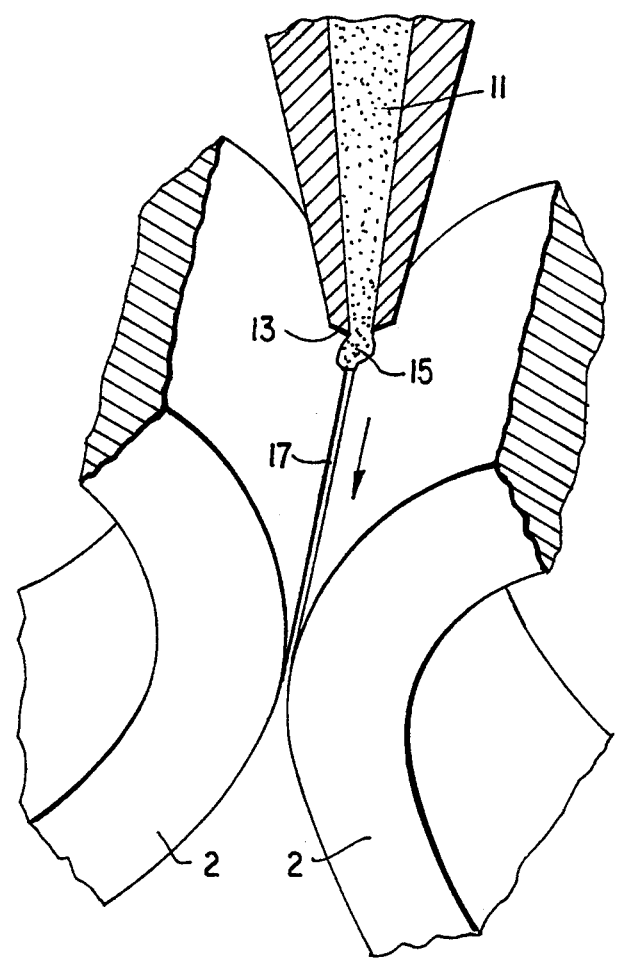
FIG. 5 illustrates yet another embodiment for bonding with extrudable material in accordance with the invention.

FIG. 5 illustrates the butt welding of two sheets along interior, contiguous lines of two sheets 2 of target material. Orifice 13 is positioned above a gap 17 that is small relative to the size of bead 15 of extrudable material. This technique allows the formation of a line of bond between two target materials in the interior of target materials.

It should be understood that the size of gap 17 illustrated in FIGS. 3–5 may be quite small because there is generally no requirement for the extrudable material to be drawn into this gap. Instead, the extrudable material is made to penetrate directly into the target material on which the bead adheres. It should also be understood that different types of butt bonds as illustrated in FIGS. 3–5 may be combined within a single application. For example, the external edge of one piece of target material may be bonded to an internal line of bond on another piece.

Figure 6:
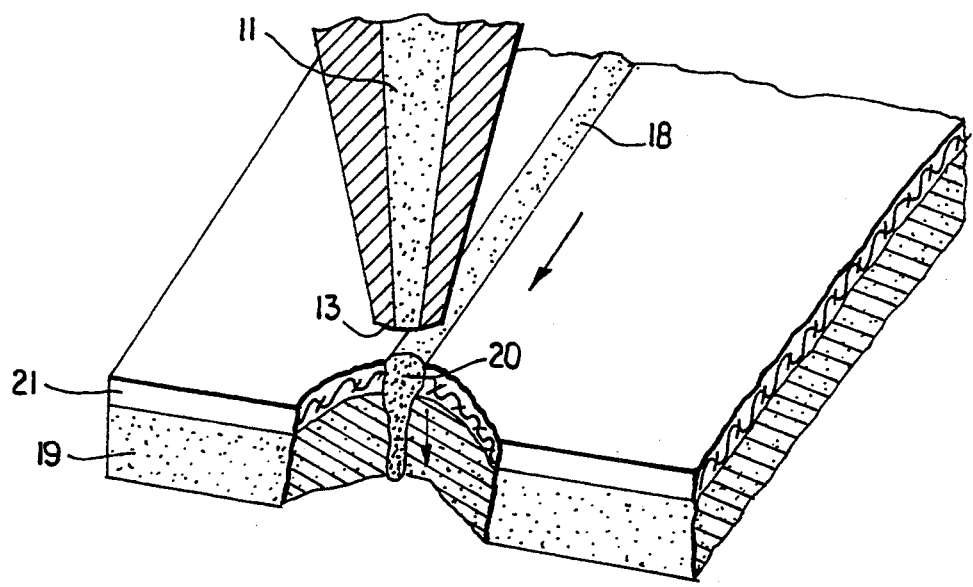
FIG. 6 illustrates bonding with extrudable material through a porous target material in accordance with the invention.

Moreover, the techniques of this invention illustrated in FIGS. 3–7, may be used to bond materials of different compositions, provided each of the materials being bonded together is susceptible to surface application of extrudable material. FIG. 6 illustrates bonding one piece of a porous target material 21 to a second material 19 according to the method of the invention. Extrudable material from orifice 13 is deposited onto the porous target material 21 and simultaneously irradiated by the laser beam to cause the extrudable material to penetrate into the porous material as shown at 20 and to contact the second piece of material 19, thus forming a strong and continuous bond between the two materials. As the target material is moved beneath the orifice, a strong and continuous seam 18 is formed between materials 19 and 21.

In accordance with the embodiment of FIG. 6, a plurality of porous materials may be layered one upon another such that the extrudable material will penetrate each of the layers and bond it to its neighbor. Thus, a plurality of porous layers may be bonded with extrudable material into a single structure.

Modifications of the invention within the scope of the appended claims will be apparent to those skilled in the art.

I claim:

1. A method for applying a heat activatable polymer composition to a substrate comprising supplying said composition in an extrudable state to a flow path for receiving said composition and directing said composition onto said substrate and simultaneously irradiating said composition in said flow path with an energy beam, wherein said composition substantially fills said flow path and said energy beam is shaped to be substantially the shape of said flow path and is directed through said composition in said flow path for transmitting energy from said beam to said composition and onto the substrate for heating the substrate as said composition is applied thereto.

2. A method according to claim 1 wherein said composition is an extrudable medium.

3. A method according to claim 1 wherein said energy beam is a laser.

4. Apparatus for applying a heat activatable polymer composition to a substrate comprising means forming a flow path for receiving said composition in an extrudable state and for directing said composition along said flow path and onto said substrate, and means for shaping an energy beam to be substantially the shape of said flow path and for directing said energy beam through said composition in said flow path and directing said energy beam onto said substrate for irradiating said composition in said flow path for transmitting energy from said beam to said composition and irradiating said substrate with said energy beam as said composition is applied to said substrate.

5. Apparatus according to claim 4 wherein said means forming a flow path comprises a nozzle.

6. Apparatus according to claim 5 wherein said nozzle comprises means for supplying said composition in a direction transverse to said flow path and an optical window aligned with said flow path for transmitting said energy beam into said flow path.

7. Apparatus according to claim 5 wherein said flow path is tapered and further comprising means for converging said energy beam along said flow path.

8. Apparatus according to claim 7 wherein said means for converging comprises an optical window aligned with said flow path.

9. Apparatus according to claim 6 further comprising means for removably supporting said nozzle.

10. Apparatus according to claim 6 further comprising means adjacent said nozzle for supplying said composition to said flow path in a substantially liquid state.

11. Apparatus according to claim 10 wherein said composition is a hot melt adhesive and said energy beam is a laser beam.

12. Apparatus according to claim 11 wherein said means for supplying comprises a heater for melting said composition and a pump for providing said melted composition to said nozzle means.

13. Apparatus according to claim 12 wherein said heater, and pump are closely adjacent said nozzle.

14. Apparatus according to claim 13 further comprising means for moving said substrate with respect to said nozzle in accordance with a predetermined pattern.

15. Apparatus according to claim 4 wherein said means forming a flow path comprises an optical window for transmitting said energy beam into said flow path.

16. Apparatus according to claim 11 wherein said laser is a YAG laser.

17. Apparatus according to claim 16 wherein said hot melt adhesive is nylon.

18. An article made in accordance with the method of claim 1.

19. An article according to claim 18 comprising two pieces bonded together by said composition.

20. An article according to claim 19 wherein said two pieces are bonded at a butt joint.

21. An article according to claim 19 wherein said two pieces are bonded at an overlap joint.

* * * * *